Patented Aug. 18, 1953

2,649,456

UNITED STATES PATENT OFFICE 2,649,456

α,α-DIPHENYL-γ-(N-METHYL-2-PIPERIDYL)-BUTYRAMIDES AND ACID ADDITION AND QUATERNARY AMMONIUM DERIVATIVES THEREOF

Lewis A. Walter, Madison, Richard H. Barry, Bloomfield, and John R. Clark, Nutley, N. J., assignors to Maltbie Laboratories, Inc., Newark, N. J., a corporation of New Jersey No Drawing. Application July 5, 1952, Serial No. 297,406

4 Claims. (Cl. 260—294)

This invention relates to a new and useful basic amide, α,α-diphenyl-γ-(N-methyl-2-piperidyl)-butyramide of the formula:

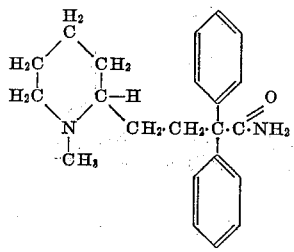

and to acid addition and quaternary ammonium salts thereof.

These compounds have been found to have marked physiologic activity as antispasmodics.

α,α-Diphenyl-γ-(N-methyl-2-piperidyl)-butyramide may be prepared by the partial hydrolysis of α,α-diphenyl-γ-(N-methyl-2-piperidyl)-butyronitrile whose preparation is described in our copending application, Serial No. 217,056, filed March 22, 1951.

Our preferred method of preparation of the compounds of the present invention is as follows:

EXAMPLE 1

*α,α-Diphenyl-γ-(N-methyl-2-piperidyl)-butyramide*

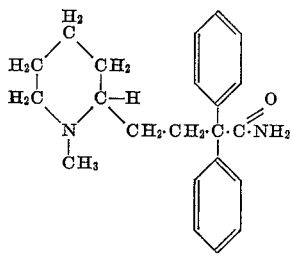

A mixture of 160 g. of α,α-diphenyl-γ-(N-methyl-2-piperidyl)-butyronitrile, 15 ml. of water, 102 ml. of acetic acid and 230 ml. of concentrated sulfuric acid was heated at 130–140° C. for thirty minutes, then was cooled and poured into a large volume of ice water. This aqueous solution was made strongly basic with excess sodium carbonate and the organic bases were extracted with benzene. This benzene extract was distilled on a steam bath to remove the solvent and the residue was crystallized from isopropanol to give 100 g. of the desired product, which had a melting point of 124–126° C. uncorrected.

EXAMPLE 2

*α,α-Diphenyl-γ-(N-methyl-2-piperidyl)-butyramide nitrate*

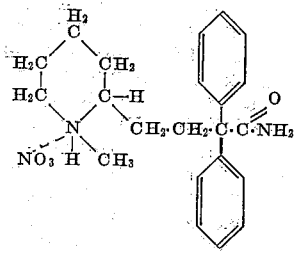

A solution of 20 g. of the product of Example 1 was dissolved in 100 ml. of absolute alcohol and just enough concentrated nitric acid was added to make the solution acidic. This solution was evaporated to dryness "in vacuo" on a steam bath and the residue was crystallized from absolute alcohol to give the crystalline nitrate, which had a melting point of 183–186° C. uncorrected.

Other acid addition products than the nitric acid addition product of Example 2 may also be made, so as to add to the compound of Example 1 a desired acid such as: hydrochloric, hydrobromic, sulfuric, citric, tartaric, phosphoric, and many others. It is noted that in each of these compounds, the acid radical represents but a small part of the total molecular weight of the completed compound. Some, at least, of these other acid addition products are very hygroscopic in character, so that it is not now considered practical to crystallize them in pure form for incorporation into dry doses, such as tablets. On the other hand, solutions, such as aqueous solution, of these compounds may be prepared in liquid form and distributed as such in any suitable manner.

EXAMPLE 3

*α,α-Diphenyl-γ-(N-methyl-2-piperidyl)-butyramide methosulfate*

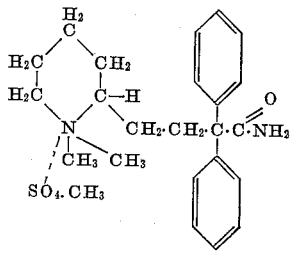

One hundred grams of the pure product of Example 1 was dissolved in 5 liters of dry benzene and 45 g. of dry methyl sulfate was added. The mixture was refluxed on a steam bath for about eight hours. After cooling the benzene was decanted and the crystalline residue was crystallized from a small quantity of methanol to give the desired product, melting at 169–172° C. uncorrected.

EXAMPLE 4

*a,a* - Diphenyl-γ-(N-methyl-2-piperidyl) - butyramide methobromide

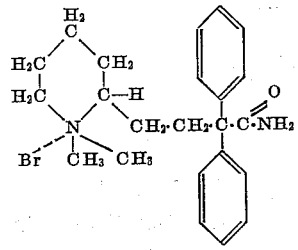

Fifty grams of the product of Example 1 was dissolved in 500 ml. of dry toluene containing 50 g. of methyl bromide and the mixture was warmed on a steam bath under reflux for eight hours. The toluene was decanted from the crystalline precipitate. The crude product was crystallized from a small quantity of water as a hydrate which decomposed at 80–84° C.

Other quaternary ammonium salts may be prepared by processes similar to those described in Examples 3 and 4 above, and including, for example, the lower alkyl halogen compounds, similar to the compound of Example 4, also lower alkyl compounds with other acid radicals as in Example 3, all within the scope of the present invention.

What is claimed is:

1. A compound of the class consisting of *a,a*-diphenyl-γ-(N-methyl-2-piperidyl)-butyramides of the formula:

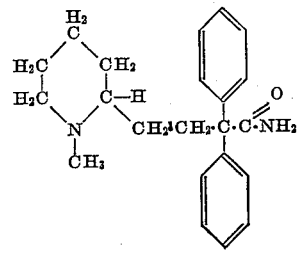

and the acid solution and quaternary ammonium salts thereof, said compounds having valuable pharmaceutical properties as antispasmodics.

2. *a,a* - Diphenyl - γ - (N-methyl-2-piperidyl) - butyramide nitrate of the formula:

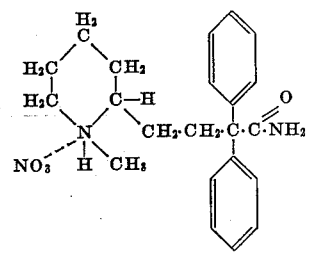

3. *a,a* - Diphenyl - γ - (N-methyl-2-piperidyl) - butyramide methosulfate of the formula:

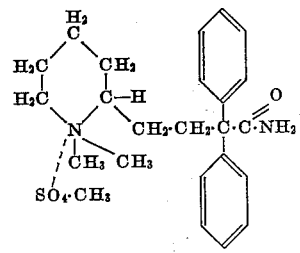

4. *a,a* - Diphenyl - γ - (N-methyl-2-piperidyl) - butyramide methobromide of the formula:

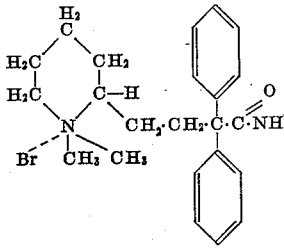

LEWIS A. WALTER.
RICHARD H. BARRY.
JOHN R. CLARK.

References Cited in the file of this patent
Chem. Abst., vol. 38 (1944) p. 551.